Figure 1:
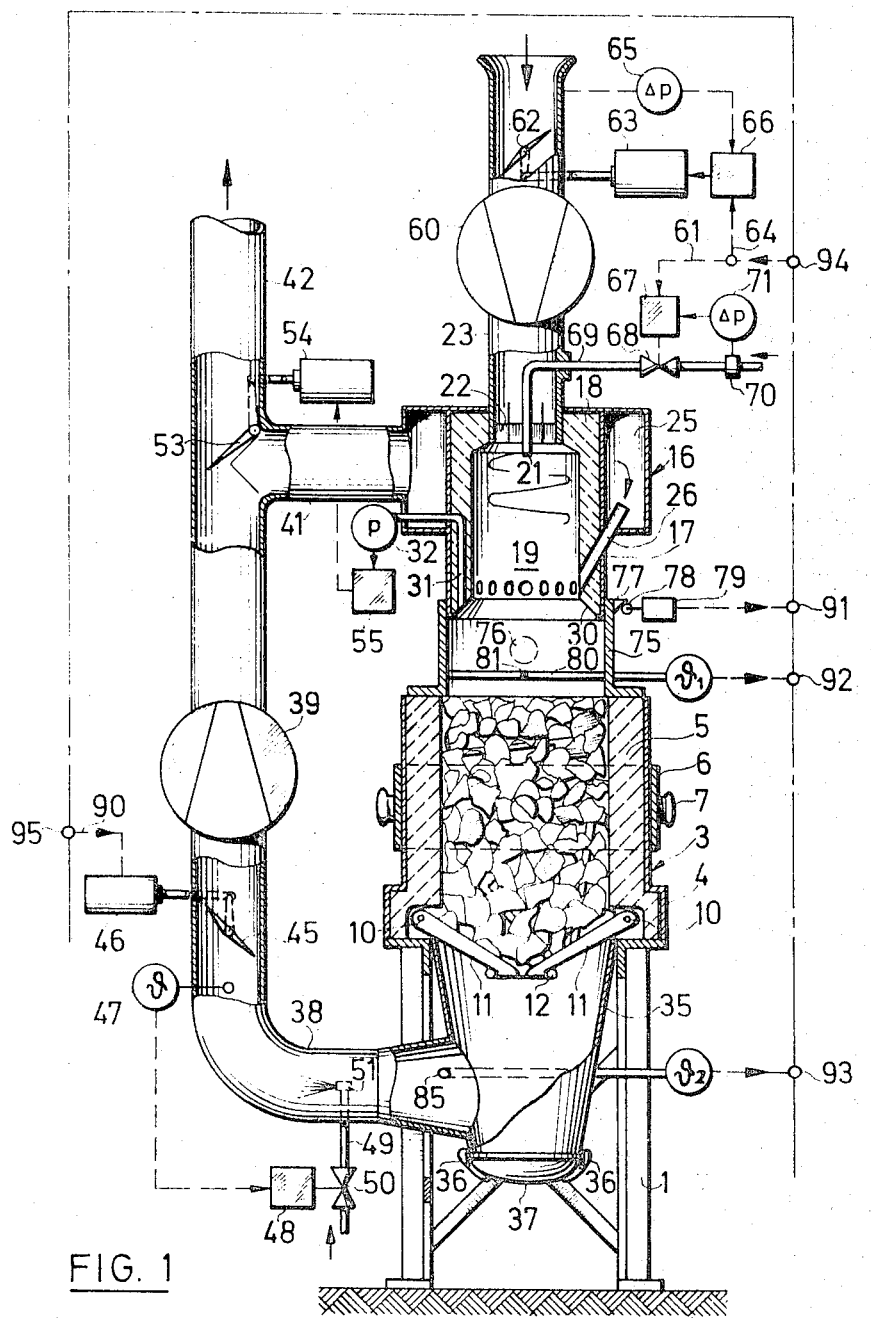

United States Patent [19]
Schoch et al.

[11] 3,837,791
[45] Sept. 24, 1974

[54] APPARATUS AND PROCESS FOR PREHEATING SCRAP IRON

[75] Inventors: Hans Schoch, Thalwil; Josef Herzog, Winterthur, both of Switzerland

[73] Assignees: Sulzer Brothers Ltd., Winterthur; Hayek Engineering Ltd., Zurich, both of, Switzerland

[22] Filed: July 6, 1973

[21] Appl. No.: 376,943

[30] Foreign Application Priority Data
July 6, 1972  Switzerland...................... 10124/72

[52] U.S. Cl. .................. 432/21, 75/44 S, 266/33 S, 432/48
[51] Int. Cl. ............................................. F27b 1/26
[58] Field of Search ................ 432/21, 48; 266/335; 75/445

[56] References Cited
UNITED STATES PATENTS
3,554,508   1/1971   Agnese .................................. 432/46
3,645,516   2/1972   Turpin ............................... 226/33 S Primary Examiner—John J. Camby
Attorney, Agent, or Firm—Kenyon & Kenyon Reilly Carr & Chapin

[57] ABSTRACT

Preheating is carried out in two time-stages. During the first stage, the burner performance is initially at a maximum and when the temperature below the charged basket reaches a certain temperature, e.g., 110°C to 160°C, the performance drops to between 60 percent to 90 percent. During this time, the temperature at the top of the basket is regulated at a maximum, e.g. 1,000°C, by adjusting the quantity of re-circulated air.

During the second stage-which beings when the temperature below the basket reaches 500°C-the quantity of recirculated gas is increased to the maximum and the burner performance regulated to maintain the temperature of 500°C below the basket. Should the burner operation fall below 30 percent, the temperature above the basket is again regulated by the quantity of re-circulated air and the temperature below by burner regulation.

6 Claims, 2 Drawing Figures

APPARATUS AND PROCESS FOR PREHEATING SCRAP IRON

This invention relates to a process and apparatus for preheating scrap iron.

As is known, scrap iron has usually been preheated before being placed into an electric melting furnace in order to reduce the consumption of electric energy and electrode material as well as to increase production without substantially increasing equipment costs. Generally, this is done by the use of hot gases. For example, the scrap which is to be preheated is put into a basket provided with a bottom that allows gas to pass through and the hot gases are blown through the scrap. The hot gases are produced by drawing air through a fan and heating the air in a burner. In order to increase efficiency, these gases are mixed with recirculated gases. The gases are then pulled through the preheating basket by means of a suction fan after which the gases escape in part into the atmosphere, and in part become circulated.

The fundamental object of the invention is to increase the efficiency of the preheating by carrying out the process in an optimal automated manner.

It is another object of the invention to decrease the formation of sulfuric acid in the scrap.

It is another object of the invention to compensate for differences in the quality of the scrap (volumetric weight, specific surface area, and heat conductivity of a charge of scrap) from charge to charge as well as for differences in the weight of the charges.

Briefly, the invention provides for the preheating of a charge of scrap iron in two time-stages. To this end, the method fo the invention comprises the steps of placing a charge of scrap iron in a basket, of passing a flow of hot gas from a burner downwardly through the basket and re-circulating a portion of the hot gas back through the basket. In addition, during a first portion of the first time-stage, the burner performance is set in an unregulated manner to a value over 60 percent of maximum performance. During the second time-stage which begins after a certain temperature has been reached at the bottom of the preheating basket, or in the gases emerging from the preheating basket, the burner performance is regulated in response to the outlet temperature, in such a way that the burner reaches a value just permissible for the bottom of the basket. Also, during the first time-stage and during a time portion ending with the second time-stage, the temperature of the heated gas at the entry into the preheating basket is regulated to a predetermined maximum-allowable value by adjusting the quantity of re-circulated gases mixed-in.

Taking into consideration the limiting conditions, i.e., that the temperature of the scrap should never be so high that the pieces of scrap-iron would sinter together and that the outflow temperature of the gases should never become so high that the bottom and subsequent parts of the equipment would become damaged, it is possible by this resolution of the preheating process into two time-stages, to cause the scrap to achieve a higher heat-content than formerly in a shorter time. At the same time, and in spite of varying weights of charges and varying scrap quality, the specific absorption of heat per charge, for a given preheating period, is more uniform. Further, the process of the invention allows the charge of scrap to be rapidly brought out of the temperature range in which sulfuric acid can condense. Finally, the process can be automated very simply.

In accordance with a further development of the invention, during the first portion of the first time-section, the burner performance is set to its maximum value, and during a second portion of this period, which begins after a predetermined temperature is reached by the gas at the exit from the basket, dependent on the condensation point of the gases, the burner performance is set to a value between 60 percent and 90 percent of its maximum performance. In this way, the preheating process is improved in that the duration of time below the condensation point becomes greatly shortened, whereby at the same time, the quantity of heat storable in the scrap can be increased.

In accordance with a further advantageous development of the process, during the first portion of the second time-stage beginning with the end of the first time-stage, the quantity of gas to be mixed in is increased to the maximum. In this way, the heat introduced into the upper layers of the charge of scrap is pushed in optimum manner toward the bottom of the preheating basket, so that it is possible to further increase the stored quantity of heat.

The process of the invention can moreover be made more economical in that the gases emerging from the preheating basket are cooled by spraying in water. This permits lower temperature conditions for the suction fan, and thus greater reliability in operation. Through this, it is also possible to use a cheaper suction fan, without the hot gas mixture containing more oxygen than would be the case with an addition of cooling air.

Figure 2:
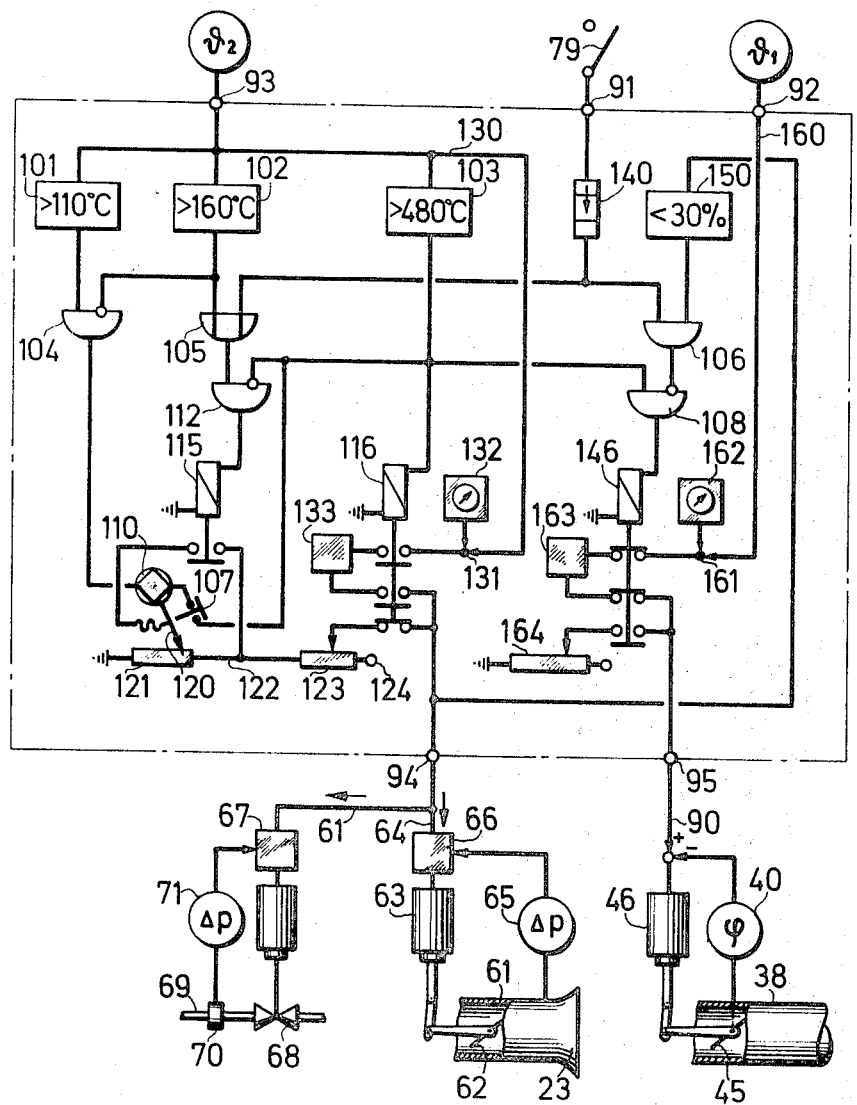

These and other objects and advantages of the invention will become more apparent from the following detailed description and appended claims taken in conjunction with the accompanying drawings in which:

FIG. 1 illustrates, partly in section and partly in elevation, an apparatus for carrying out the process of the invention; and FIG. 2 illustrates a circuit-diagram for controlling the apparatus of FIG. 1.

Referring to FIG. 1, a frame 1 supports a preheating basket 3 filled with scrap. The basket 3 is round in plan view and has a steel case 4 with a ceramic lining 5. A support ring 6 is fastened to the case 4 and has two diagonally opposite radial trunnions 7, by means of which the basket 3 can be lifted, by a transport device (not shown) out of the frame 1 and be transported. The bottom of the preheating basket 3 is formed of radial pivotable grate-bars 11. Each grate-bar 11 is hinged to a horizontal shaft 10, disposed in a corresponding recess at the lower end of the lining 5. In the illustrated position, the grate-rods 11 are held together by a chain 12 wrapped round their free ends.

A sheet metal cone 35 is fastened to the upper end of the frame 1 and contracts downwardly. The lower end of the cone 35 is closed by a bottom 37. A pipe 38 is connected to the cone 35. A suction-fan 39 is mounted in the pipe 38 by means of which the gases emerging from the bottom of the preheating basket 3 are drawn away. The pipe 38 branches beyond the fan 39 into two branches 41, 42. One branch 42 is connected to a chimney (not shown) while the other branch 41 passes to an annular gas-distributing box 25. A distributor-flap 53 operated by a servomotor 54 is installed at the branch point. A flap 45 is positioned in front of the suction-fan 39 in the pipe 38 and is operated by a servomotor 46. This servomotor 46 receives a desired value for the setting of the flap 45 over a signal line 90, which runs from a point 95. A temperature-senser 47, as well as a water-injecting nozzle 51 for cooling the gases are mounted in the pipe 38 between the flap 45 and cone 35. This nozzle 51 is connected to a water-pipe 49, in which a valve 50 is provided and which is adjusted by a regulator 48 in response to the temperature measured by the senser 47.

A hot gas producer 16 is disposed above the basket 3 which has a steel case 17 having a ceramic lining 18 delimiting a cylindrical combustion chamber 19. A burner 21 is mounted at the upper end of the combustion chamber 19 and has a nozzle surrounded by a swirl-device 22. This swirl-device 22 is situated at the lower end of an air-supply pipe 23 having an outlet into the combustion-chamber 19, so that the swirl-device 22 for the inflowing combustion air imparts a swirling motion to the air upon entry into the combustion chamber 19. In this air-supply pipe 23 is an air-fan 60, and ahead of this fan, in the air-flow direction, is an adjustable throttle-flap 62, operated by a servomotor 63.

The upper half of the case 17 of the hot-gas producer 16 is surrounded by the annular gas-distributing box 25 that is connected over a plurality of e.g. twenty, gas-mixing pipes 26 extending through the ceramic lining 18, with the combustion chamber 19. Thus, through the intermediary of the gas-distributing box 25 and the gas-mixing pipes 26, a part of the gases sucked away from the lower end of the preheating basket 3 is conducted into the combustion chamber 19 and is mixed with the hot gases produced by the burner 21. The remainder of the sucked-away gases escapes, by way of the branch 42 and the chimney (not shown) into the atmosphere. A pressure measuring pipe 31 is connected at the lower end of the combustion chamber 19 and runs to a measuring instrument 32, which is connected, over a regulator 55, with the servomotor 54 actuating distributor-flap 53.

In order to supply fuel, such as fuel oil to the burner 21, a pipe 69 is connected to the burner 21. This pipe 69 has a valve 68 adjusted by a regulator 67. The regulator 67 receives, as an actual value, a signal representing the oil quantity. This signal is formed by the aid of a measuring diaphragm 70 and a pressure-difference meter 71 connected to the diaphragm 70. The regulator 67 moreover receives, over a signal line 61, a desired value for the fuel-oil quantity. This signal comes from the point 94 as will be explained farther on. The desired value coming from the point 94 is also conducted, over a signal line 64, to a regulator 66 that influences the servomotor 63 which adjusts the flap 62 in the air-supply pipe 23. In order to provide an actual value, the regulator 66 receives an air-quantity signal that is formed by the aid of a pressure-difference meter 65 connected to the air-supply pipe 23 upstream of the flap 62.

A ring 75 is positioned between the lower end of the hot-gas producer 16 and the upper end of the preheating basket 3 which, similarly to the preheating basket 3, is provided with two radial trunnions 76 for lifting purposes and which is slidably mounted on the case 17. The upper end of the ring 75 has an exterior nose 77 which, in the illustrated position of the ring 75 and by means of a roller 78, switches on a switch 79 which is connected with a point 91. The lower region of the ring 75 is provided with a cross 80 of heat-resistant metal. A temperature-sensor 81 is located at the point of intersection of the arms of the cross 80 to determine the inflow temperature $v\,1$ of the gases flowing into the preheating basket 3 and to emit a corresponding signal to a point 92. Another temperature-sensor 85 is provided at the region where gas emerges out of the preheating basket 3 to supply a signal, which corresponds to the outflow temperature $v\,2$ of the gases to the point 93.

In FIG. 1, the points 91 – 95 are connected together by a dot-dash line. A corresponding line is given in FIG. 2 as a frame for the circuit-diagram.

Referring to FIG. 2, three conductors run from the connection point 93, to which the gas-outflow temperature $v\,2$ is supplied to the inputs of three temperature-limiting switches 101, 102, 103, which in each case given an L signal when the input signal exceeds 110°C, 160°C and 480°C, respectively. The output signal from the temperature-limiting switch 101 goes to an AND element 104. The output signal of the temperature-limiting switch 102 goes on the one hand to an OR element 105 and on the other hand - inversely superimposed - to the AND element 104. The output signal from the temperature-limiting switch 103 is sent to four branches. The first branch goes to a relay 116, the second branch to a first terminal of an end-switch 107, the third branch to an AND element 112, on which there is inversely superposed the output signal of the switch 103, and the fourth branch to an AND element 108.

The output of the AND element 104 is connected with that input terminal of a potentiometer motor 110 which is associated with a motion of potentiometer tap 120, coupled to the motor 110, in a clockwise direction. The output of the OR element 105 acts on the AND element 112, whose output is connected to a relay 115. The second terminal of the end-switch 107 is connected with that terminal of the potentiometer motor 110 which is associated with a motion of the potentiometer tap 120 in a counterclockwise direction. The end-switch 107 is arranged, relative to the potentiometer tap 120 of the associated motor potentiometer 121 in such a way that, at a movement of the tap 120 in the counterclockwise direction, upon reaching the zero position, the switch 107 switches off the motor 110, thus interrupting the movement of the tap 120 automatically.

The tap 120 is connected by a flexible conductor with a contact of the relay 115. A conductor runs from the opposite contact of the relay 115 to a line 122 which connects the motor potentiometer 121 cooperating with the tap 120 with a potentiometer 123 which is adjustable by hand. The two potentiometers 123 and 121 are connected in series between a reference voltage supplied to a terminal 124, and the grounding.

In addition to the three aforesaid conductors, a fourth conductor 130 runs from the point 93 to a comparison point 131, in which is formed the difference between the signal of a manually adjustable signal-emitter 132 and the temperature signal $v\,2$ brought in by the conductor 130. The output from the comparison point 131 goes, over a first set of contacts of the relay 116, which is connected in only in the energized state of the relay 116, to a regulator 133. The output of this regulator 133 goes over a second set of contacts, connected in only when the relay 116 is energized, to the point 94, to which are connected the regulator 67 for the fuel oil and the regulator 66 for the air supply. The manually adjustable tap of the potentiometer 123 is connected with the point 94 over a third set of contacts of the relay 116 only when the relay is not energized.

The input of a time-delay element 140 is connected to the point 91 connected with the switch 79. At a jump of the input signal coming from the point 91 from zero to L the time-delay element 140 sends the signal onward, delayed e.g. by four minutes, but which on the other hand lets the signal through at once at a jump from L to O. The output of the time-delay element 140 acts, on the one hand, on the OR element 105 and, on the other hand, on an AND element 106 whose output is switched inversely to the AND element 108. The AND element 108 has an output side connected with a relay 146. The second input of the AND element 106 is connected with the output of a limit-switch 150 for the burner performance, whose input side is connected with the point 94. The limit-switch 150 gives an L signal as soon as and for as long as the output signal of the regulator 133, which as a desired value is supplied to the requlator 67 for the fuel-oil supply and to the regulator 66 for the air supply, falls below of 30 percent of the burner performance.

The point 92 to which is supplied the gas inflow temperature $v\,1$ is connected by a conductor 160 to a comparison point 161, where a difference is formed between the signal of a manually adjustable signal-emitter 162 and the temperature signal $v\,1$ supplied over the conductor 160. The output of the comparison point 161 goes, over a first set of contacts of the relay 146 closed only in the nonenergized state of the relay, to a regulator 163. The output of this regulator 163 goes over a second set of contacts, likewise only when the relay is not energized, to the point 95, to which the servo-motor 46 for the flap 45 is connected. The manually adjustable tap of a potentiometer 164 is, over a third set of contacts of the relay 146, and only when the relay is energized, likewise connected with the point 95. The flap 45 is, in a refinement of the example of FIG. 1, connected over a feed back system 40 giving the flap setting $v$ with the input of the servomotor 46.

The apparatus of FIGS. 1 and 2 functions as follows:

The preheating basket 3, which has been emptied into an electromelting furnace, is set upon a stand (not shown) for filling. The grate-rods 11 which had been pivoted downward for emptying the basket are then raised into the position shown, in FIG. 1, and secured in position by the chain 12. Then the basket is filled with scrap iron, care being taken that the scrap having the greater specific surface goes in the bottom part of the basket. Next, the filled basket 3 is set on the frame 1, and the ring 75 is set on the upper rim of the basket. Upon setting of the ring 75 on the basket, the switch 79 becomes switched on, by means of which, in a way not shown, the air-blower 60 and the suction fan 39, as well as the burner 21 of the hot-gas producer 16, are automatically actuated to operate.

The relays 115, 116 and 146 at this time are in their illustrated, i.e., not-energized state, so that the desired value set at the manual potentiometer 123, corresponding to the maximum burner performance exists at the point 94 for the control of the regulator 67 for the fuel supply and of the regulator 66 for the air supply.

At the same time, the adjusting magnitude coming from the regulator 163 acts at the point 95. This adjusting magnitude adjusts, via the servomotor 46, the flap 45 in the pipe 38 in such a way that the inflow temperature $v\,1$ of the gases going into the basket 3 corresponds to the desired value, e.g., 1,000°C, set at the signal emitter 162. By adjusting the flap 45, the quantity of gas circulated becomes changed, in such a way that by increasing this quantity, the gas inflow temperature $v\,1$ becomes lowered; and vice versa.

The distributor flap 53 is adjusted by the servomotor 54, dependent on the pressure measured by the pressure senser 32, over the regulator 55, in such a way that the pressure in the ring 75 is somewhat below atmospheric pressure. Thus, in the case of leaks between the hot-gas producer 16 and the ring 75, and also between the ring 75 and the basket 3, air is sucked in in all cases, but no hot gases emerge to the exterior.

The process described up to the point represents the first portion of the first time-stage.

During this first portion, the pieces of scrap in the upper part of the basket 3 become highly heated, at least at their surfaces, so that the gas outflow temperature $v\,2$ rises slowly. When this outflow temperature reaches a first limit value of 110°C, this means that any ice that may have been melted and the residual moisture has certainly been evaporated. The temperature-limit switch 101 then switches the output of the AND element 104 from O to L. Because of this, the potentiometer motor 110 begins to move the tap 120 clockwise, so that the tap 12C shifts slowly to the left, whereby the end-switch 107 becomes closed.

If the gas-outflow temperature $v\,2$, measured by the temperature senser 85, rises to a second limit value of 160°C, then the temperature-limit switch 102, because of the inverted connection, switches the AND element 104 to O. The potentiometer motor 110 then comes to a standstill. At the same time, the output of the AND element 112 jumps to L, through which the relay 115 becomes energized and the associated set of contacts becomes closed. Thus, the part of the potentiometer 121 situated to the right of the potentiometer tap 120, as viewed, becomes short-circuited. This results in the voltage put out by the potentiometer 123 dropping to a new value, and the desired value existing at point 94 becomes smaller. The burner performance is then reduced to a value of 60 percent to 90 percent of the previously-set maximum performance. Through a suitable selection and setting of the potentiometers 121 and 123 the reduced value can be optimized with a view to reaching good thermal efficiency and uniform action of the heat on the scrap. By combining with the duration of the rise of the gas outflow temperature $v\,2$ from 110°C to 160°C, it is possible to introduce the influence of the quality of the scrap in the heat transfer optimisation. After reduction of the burner performance, the temperature in the scrap rises slower than previously.

If the outflow temperature $v\,2$ four minutes after the beginning of the preheating has not reached the second limit value of 160°C, which might be the case for scrap in small pieces, then the time-delay element 140 by a signal to the OR element 105 orders the described reduction of the desired value for the burner performance, in that the relay 115 becomes attracted. Then, as already described, the voltage tapped from the potentiometer 123 drops.

With the attainment of a temperature of 160°C, or after a duration of 4 minutes since the actuation of the switch 79, the second section of the first time-stage begins and thereafter ends when the gas-outflow temperature $v\,2$ reaches 480°C.

When the gas outflow temperature $v\,2$ measured by the temperature-sensor 85 reaches a third limit value of 480°C, then the output of the temperature-limit switch 103 jumps to L. Through the inverse connection of the switch 103 with the AND element 112, the output of the AND element 112 becomes 0, so that the relay 115 drops off. Because the end-switch 107, which is released by the potentiometer tap 120 during movement to the left, is closed, the potentiometer tap 120, fed by the temperature-limit switch 103, begins to move counterclockwise, until automatically coming to a standstill in the zero position through the opening of the end-switch 107.

Furthermore, from the output of the temperature-limit switch 103, the relay 116 becomes energized. Thus, the first and second sets of contacts become closed and the third set of contacts becomes opened. As a result of this, the potentiometer 123 becomes switched out, and the output of the regulator 133 becomes connected with the point 94, so that it is now the regulator 133 which supplies the desired value for the burner performance. The regulator 133 regulates the gas outflow temperature $v\,2$ to the desired value set at the signal emitter 132, for example 500°C. This regulation occurs during the entire second stage.

As a further result of the actuation of the temperature-limit switch 103, the output of the AND element 108 jumps to L, so that the relay 146 becomes energized and the first and the second sets of contacts become opened, while the third set of contacts become closed. Through this, the influence of the regulator 163 on the point 95 becomes interrupted, and instead of this, the signal tapped from the potentiometer 164 is conducted over the point 95 to the servomotor 46 for the flap 45. The potentiometer 164 is thus set so that the flap 45 becomes fully opened, so that the quantity of gas circulated rises to a maximum value. At this switch-over of the relay 146, the second time-stage has begun, and circulation of the maximum quantity of gas is maintained during the first portion of the second time-stage. During this maximum circulation, during which the inflow temperature $v\,1$ is no longer regulated, the high-temperature region in the charge of scrap moves downward toward the bottom of the basket 3, whereby the gas-inflow temperature $v\,1$ decreases somewhat because of the increase in the quantity of mixed-in gas.

During this shift, the burner performance gradually becomes decreased by the signal of the out-flow temperature $v\,2$ as measured by the temperature-senser 85 which temperature tends to rise. If the control magnitude set on the signal-emitter 162 falls below the value of 30 percent of maximum performance set on the limit-switch 150 for the burner performance, then, because of the inverse switching of the output from the AND element 106 with the AND element 108, the output of the AND element 108 becomes 0, so that the relay 146 drops off. Thus, the first section of the second time-stage is ended. The potentiometer 164 is again switched off, and the regulator 163 is again switched on, so that the maximum circulation ceases, and the servomotor 46 again adjusts the flap 45 so that the quantity of gas circulated depends on the gas-inflow temperature $v\,1$. During the second section of the second time-stage, therefore the upper region of the charge of scrap is again brought to the maximum attainable temperature of 1,000°C.

At the end of the time available for the preheating of the scrap, which is equal to the sum of the two time-stages, the charge of scrap thus receives a maximum of heat. At the end of the second time-stage, the burner 21 is turned off by the switch 79, in that the ring 75 becomes lifted. Also, by means of the switch 79, the air-blower 60 and the suction-fan 39 come to a standstill. The preheating basket 3 is then lifted off the frame 1, and is emptied over the electromelting furnace by removal of the chain 12. Then the described preheating process begins anew.

Summarizing: The process described as an example goes as follows:

During the first portion of the first time-stage, the burner performance is set, unregulated, to a maximum value, and the inflow-temperature $v\,1$ of the gas is regulated to the maximum allowable temperature of about 1,000°C by adjusting the quantity of gas circulated. During the second portion of the first time-stage, which begins as soon as the outflow temperature reaches the range of 120°C to 160°C, the burner performance, which is optimizable and depends on the quality of scrap, the basket dimensions, and other limiting conditions, is, with an economical design of the burner, reduced to between 60 percent and 90 percent of the maximum. Also, during the second portion of this first time-stage, the inflow temperature $v\,1$ is regulated by adjusting the quantity of gas circulated.

During the first portion of the second time-stage, which begins as soon as the outflow temperature $v\,2$ has reached a limit value of about 500°C, the quantity of gas circulated is increased to the maximum attainable by the apparatus and the outflow temperature $v\,2$ is regulated to the limit value of about 500°C by adjusting the burner performance.

During the second portion of the second time-stage, which begins as soon as the burner performance has dropped to a limit value of for example 30 percent of the maximum, the inflow temperature $v\,1$ is again regulated by adjusting the quantity of gas circulated and, at the same time, the outflow temperature $v\,2$ is again regulated to the limit value of 500°C by adjusting the burner performance.

It is also possible to influence the quantity of gas circulated without employing the flap 45. In that case, the speed of the suction-fan 39 is varied in a suitable manner. Furthermore, it is possible to let the output signal of the pressure-regulator 55 act on the servomotor 46 for the distributor flap 53.

It is also possible to adjust the burner performance during the entire first time-stage to a high value. In this case, the performance does not become adjusted to a maximum value and then to a reduced value. Instead of preheating with fuel oil, this can also be done with fuel gas.

What is claimed is:

1. A process for preheating scrap iron comprising the steps of placing a charge of scrap iron in a basket below a burner;

passing a flow of hot gas from the burner through the basket is a predetermined flow path to heat the charge of scrap iron;

re-circulating a portion of the flow of hot gas passing from the basket into said flow path for passage through the basket;

adjusting the performance of the burner during a first portion of a first time-stage to a value over 60 percent of a maximum predetermined performance of the burner;

adjusting the quantity of the re-circulation portion of hot gas during said first time-stage to regulate the temperature of the flow of hot gas to the basket at a predetermined maximum value;

regulating the performance of the burner during a first portion of a second time-stage in response to the temperature at the bottom of the basket reaching a predetermined maximum value to maintain said value; and adjusting the quantity of the re-circulation portion of the hot gas during a time portion ending with said second time-stage to regulate again the temperature of the flow of hot gas to the basket at said predetermined maximum value.

2. A process as set forth in claim 1 wherein the performance of the burner is at a maximum during said first portion of said first time-stage and is at a value between 60 percent and 90 percent of said maximum during a second portion of said first time-stage; said second portion beginning after the hot gas flow from the basket reaches a temperature dependent on the condensation point of the hot gas.

3. A process as set forth in claim 1 wherein the portion of hot gas re-circulated during said first portion of said second time-stage is increased to a maximum.

4. A process as set forth in claim 3 wherein said second time-stage begins when the temperature measured at the bottom of the basket reaches 500°C.

5. A process as set forth in claim 1 wherein said first portion of said second time-stage ends when the burner performance drops to 30 percent of maximum and wherein the quantity of re-circulated air is adjusted during a following second portion of said second time-stage to regulate the temperature of the flow of hot gas to the basket at said maximum value thereof and the burner performance is adjusted to regulate the temperature at the bottom of the basket at the maximum value thereof.

6. A process as set forth in claim 1 which further comprises the step of spraying water into the hot gas passing from the basket to cool the hot gas.

* * * * *